United States Patent [19]

Kirtley, Jr.

[11] 3,999,093
[45] Dec. 21, 1976

[54] ROTATING ELECTRIC MACHINE HAVING A CONTROLLED GRADIENT WINDING AND A CIRCUMFERENTIALLY SEGMENTED MAGNETIC CORE ARMATURE

[75] Inventor: James L. Kirtley, Jr., Brookline, Mass.

[73] Assignee: Massachusetts Institute of Technology, Cambridge, Mass.

[22] Filed: June 21, 1973

[21] Appl. No.: 372,130

[52] U.S. Cl. .............................. 310/198; 310/201; 310/205; 310/254

[51] Int. Cl.² ...................................... H02K 19/00

[58] Field of Search ............. 310/40, 52, 198, 202, 310/207, 215, 216, 171, 201, 156, 259, 254, 257, 258, 179, 10, 217, 218

[56] References Cited

UNITED STATES PATENTS

| | | | |
|---|---|---|---|
| 2,320,866 | 6/1943 | Hill | 310/215 |
| 2,774,000 | 12/1956 | Ross | 310/216 |
| 3,353,046 | 11/1967 | Papst | 310/216 |
| 3,551,784 | 12/1970 | Shaw et al. | 310/198 |
| 3,652,889 | 3/1972 | Reece et al. | 310/259 |
| 3,731,127 | 5/1973 | Harrington | 310/256 |
| 3,735,169 | 5/1973 | Balke et al. | 310/215 |
| 3,742,265 | 6/1973 | Smith, Jr. | 310/52 |
| 3,743,875 | 7/1973 | Smith, Jr. et al. | 310/198 |
| 3,781,578 | 12/1973 | Smith, Jr. et al. | 310/254 |
| 3,787,744 | 1/1974 | Saito | 310/258 |

FOREIGN PATENTS OR APPLICATIONS

| | | | |
|---|---|---|---|
| 1,092,864 | 11/1967 | United Kingdom | 310/216 |

*Primary Examiner*—J. D. Miller
*Assistant Examiner*—Patrick R. Salce
*Attorney, Agent, or Firm*—Arthur A. Smith, Jr.; Robert Shaw; Martin M. Santa

[57] ABSTRACT

A high voltage rotating electric machine having an armature that includes a continuous gradient a-c winding and comprising a high permeability magnetic material subdivided in the circumferential direction into a plurality of segments. Each segment is electrically insulated from every other segment.

12 Claims, 7 Drawing Figures

ROTATING ELECTRIC MACHINE HAVING A CONTROLLED GRADIENT WINDING AND A CIRCUMFERENTIALLY SEGMENTED MAGNETIC CORE ARMATURE

The present invention relates to rotating electric machines.

Although this invention can be employed in other than superconducting machines, it is particularly useful in superconducting apparatus, as later noted. In order to keep the present specification to a reasonable size, applicant hereby incorporates by reference the following applications for Letters Patent, journal article and theses—all of which relate to various facets of superconducting machines; Ser. No. 210,088, filed Dec. 21, 1971 (now U.S. Pat. No. 3,743,867, Smith), "High Voltage Oil Insulated and Cooled Armature Windings"; Ser. No. 256,962, filed May 25, 1972 (now U.S. Pat. No. 3,742,265, Smith), "Superconducting Apparatus With Double Armature Structure"; Ser. No. 279,034 filed Aug. 9, 1972 (now U.S. Pat. No. 3,781,578, Smith et al.) "Stator Structure for Electrical Machine"; Ser. No. 257,640, filed May 30, 1972 (Smith et al.), "Relatively Rotatable Cryogenic Transfer System"; Ser. No. 256,803, filed May 25, 1972 now U.S. Pat. No. 3,772,542, (Woodson), "Eddy-Current Shield"; Ser. No. 281,816, filed Aug. 18, 1972 (Smith et al.), "Rotor Structure For Supercooled Field Winding"; a journal article entitled "The Application of Superconductors in the Field Windings of Large Synchronous Machines," Woodson et al., IEEE Transactions of Power Apparatus and Systems, vol., PAS 90, No. 2, June 1971, a copy of which is in the U.S. Patent Office Scientific Library; the doctoral thesis of David L. Luck entitled "Electromechamical and Thermal Effects of Faults Upon Superconducting Generators" (M.I.T. libraries on or about June 28, 1971); the doctoral thesis of James L. Kirtley, Jr. entitled "Design and Construction of an Armature for an Alternator with a Superconducting Field Winding" (M.I.T. libraries on or about Oct. 26, 1971, as well as U.S. Patent Office Scientific Library); the masters thesis of John Paul Kelsey entitled "A Static Analysis of a Synchronous Transformer," (M.I.T. libraries on or about June 1972); the doctoral thesis of David L. Greene entitled "Analysis of a Marine Propulsion System Incorporating Superconducting Electrical Machinery" (M.I.T. libraries on or about June 24, 1970); the masters thesis of John H. Murphy entitled "High Vacuum Shaft Seals for a Superconducting Generator" (M.I.T. libraries on or about Feb. 25, 1971); the masters thesis of James C. Dudley entitled "Fabrication of an Armature for a Generator with a Superconducting Rotating Field Winding" (M.I.T. libraries on or about June 24, 1969); and the masters thesis of W. David Lee entitled "Continuous Transfer of Liquid Helium to a Rotating Dewar" (M.I.T. libraries, on or about Sept. 19, 1970).

The following U.S. Patents are of interest: 2,774,000 (Ross); 3,187,208 (Van De Graaf); 3,289,066 (Van De Graaf); 3,307,059 (Kitano et al.); and 3,652,889 (Relch et al.).

In 1971 Ser. No. 166,083, filed July 26, 1971, (now U.S. Pat. No. 3,743,875), by the present inventor and another, entitled "Polyphase Synchronous Alternators Having a Controlled Voltage Gradient Armature Winding," and hereby incorporated by reference herein, there is described in great detail a "controlled gradient a-c winding" as the term is used herein. There accompanies herewith an application entitled "Rotating Electric Machine Having a Toroidal Winding Armature," Ser. No. 372,129, filed June 21, 1973, of the present inventor and another, and hereby incorporated by reference, in which there is described a further "controlled gradient a-c winding" as the term is used herein. Each of the two types of controlled gradient windings can properly be categorized as a substantially continuous gradient winding. In any event, both have the characteristic that the voltage between immediately adjacent turns of the armature is the (small) voltage difference that appears between adjacent turns (or near turns) of the armature winding. In conventional high power machines the magnetic iron core precludes effective use of such controlled gradient windings in the armature because the core acts to bring each coil in close electrical proximity with ground potential.

Accordingly, an object of the present invention is to provide a high power, density rotating electric machine having a magnetic iron core in the armature but a machine in which, nevertheless, the part of the core adjacent the armature winding is at about the same potential as the armature conductor to which said part is adjacent.

An advantage gained by the foregoing is that the amount of insulation required may be reduced or the terminal voltage may be increased by using more turns consisting of smaller conductors in the armature winding. Another object, therefore, is to provide a high power, iron core machine which is capable of generating very high voltages, much higher then the present 24 to 26 kV limitation that now exists for such machines.

These and still further objects are discussed in the description that follows and are particularly delineated in the appended claims.

The objects of the invention are attained in a rotating electric machine that includes, in combination, a rotatable field and an armature comprising a controlled gradient a-c winding and a high permeability magnetic core subdivided in the circumferential (azimuthal) direction into a plurality of segments. Each segment of the core is insulated from every other core segment in order that each segment be essentially at the electric potential of the conductor or conductors of the armature winding immediately adjacent that particular segment. Each segment of the core is laminated to reduce eddy current losses, as in a conventional machine.

The invention is hereinafter discussed with reference to the accompanying drawing in which.

As is above noted, the concepts herein discussed have particular use in connection with superconducting machines which, as discussed in application Ser. No. 166,083, typically are high-voltage designs. In such machines, ordinarily, the armature is the stator and the rotor is the field, which is the configuration disclosed here. While the rotor is a necessary part of the present machine, it is not the part which is modified in accordance with the present concepts. Thus, the rotor in all the figures is shown more or less in diagrammatic form which can be considered to denote either superconducting or normally conducting structures. Detailed descriptions of superconducting rotors are contained in a number of the references above; see, for example, said applications Ser. Nos. 281,816 and 257,640.

Also, the controlled gradient armature winding forms a vital part of the present apparatus, but particular embodiments of such a winding are found in said application Ser. No. 166,083 and in the accompanying application. Thus, in the figures, the controlled gradient armature winding is also shown more or less in diagrammatic form. It should be here noted, however, that the armature winding is substantially a continuous gradient winding in that the voltage gradient of each conductor or bar is that which appears between adjacent (or near) bars in the armature.

Figure 1:
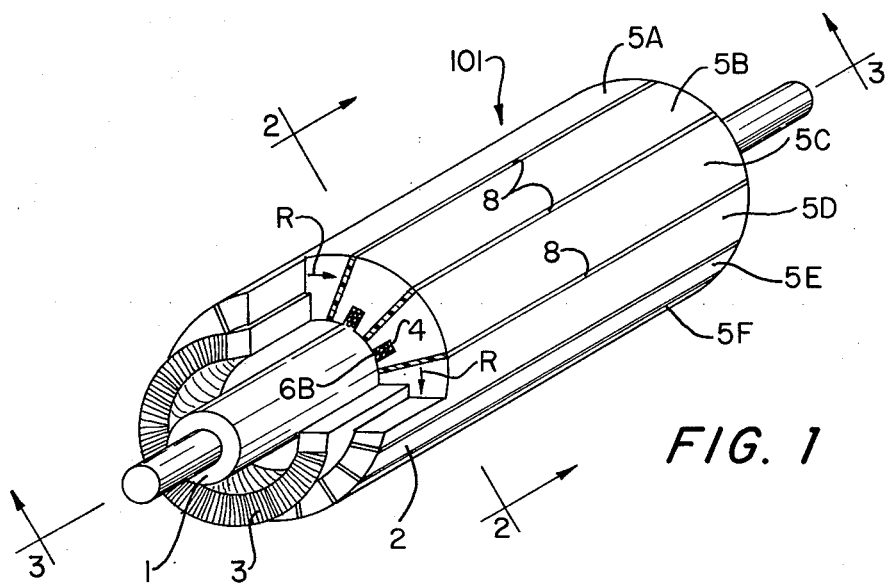
FIG. 1 is an isometric diagrammatic view, partially cut away, showing the field and the armature of a rotating electric machine embodying the present inventive concepts (some cross hatching in this and the other figures has been omitted for clarity)
Figure 2:
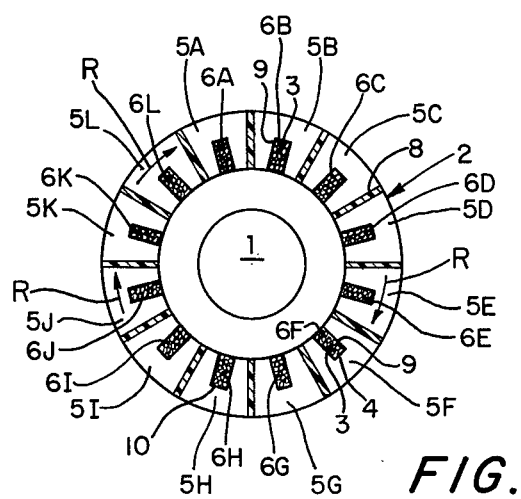
FIG. 2 is a section view taken upon the line 2—2 in FIG. 1 and looking in the direction of the arrows.

Turning now to the drawing, a high-voltage, rotating electric machine is shown at 101 in FIG. 1 comprising a rotatable field or field winding 1 and an armature or stator 2. (It will be appreciated that the roles of the rotor 1 and the stator 2 can be reversed or, even that both can be rotatable (see said application Ser. No. 256,962), or that the field winding can be outside; but ordinarily and for purposes of this explanation the armature is a part of the stator and the field is the rotatable element, and is inside.) The armature 2 has a controlled gradient a-c winding 3 comprising turns or bars 6A, 6B. . . slots 4 of a high-permeability magnetic-material core 5 subdivided in the circumferential or azimuthal direction into a plurality of segments 5A, 5B each segment being electrically insulated from all other segments in the circumferential or azimuthal direction (represented by the arrows labeled R), as best shown in FIG. 2, by an insulating material 8 between segments. In this way, the electric potential of each segment is substantially the same as the electric potential of the adjacent portion of the controlled gradient winding. For example, the core segment 5A is at substantially the same electric potential as winding bar 6A, the core segment 5B is at substantially the same electric potential as the winding bar 6B, etc. Therefore, minimal slot insulation 9 is required. Bar 6A is insulated from bars 6L and 6B by segment insulation 8. The segment insulation need be only enough for turn to turn voltage, since the controlled gradient winding, as above noted, subjects any particular winding coil or bar only to the potential between immediately adjacent (or near) armature coils.

Figure 3:
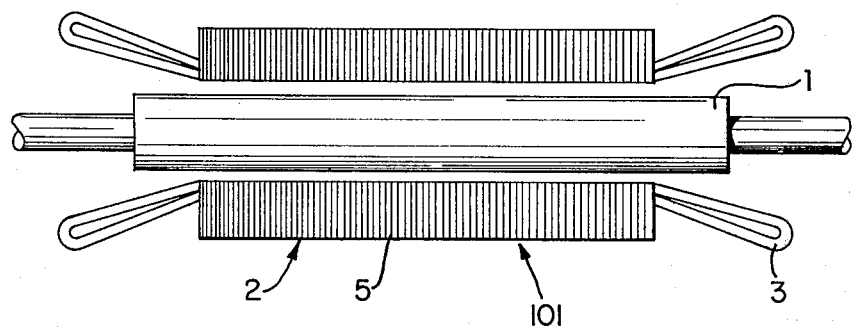
FIG. 3 is a section view taken upon the line 3—3 in FIG. 1 and looking in the direction of the arrows.
Figure 7:
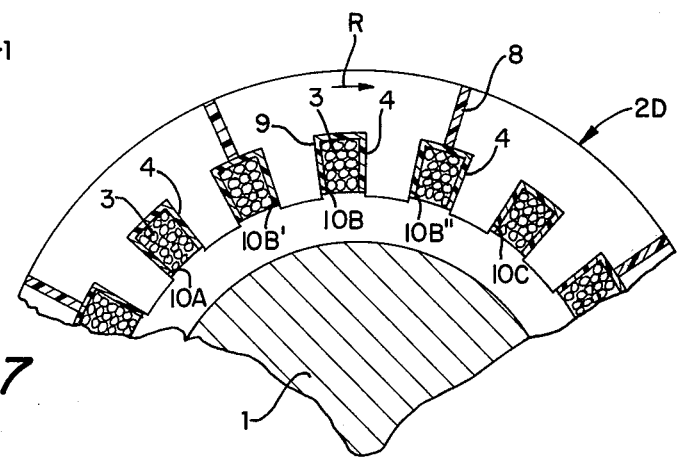

Each segment in the embodiment of FIGS. 1–3 contains a single slot 4 to receive the bars 6A, 6B. . . ; however, each segment may contain more than one slot, as shown in FIG. 7, so that the electrical potential between bars may exceed that potential which appears between immediately adjacent bars. In any event, however, the potential is less than that found in conventional armatures with continuously circumferentially conductive magnetic iron cores and can be reduced to a relatively low level. The segments in the embodiment of FIG. 7 each contain one interior slot 10A, 10B, 10C. . . and each segment contains as well two half slots (e.g., 10B' and 10B'') located circumferentially at the position of the insulation between adjacent segments.

Figure 4:
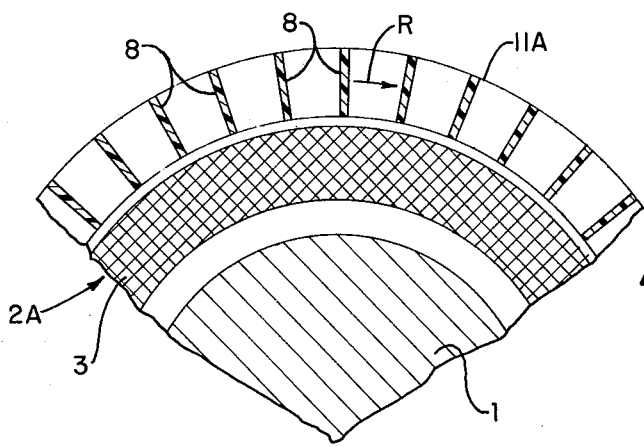
FIGS. 4, 5, 6 and 7 are partial section views similar to the view of FIG. 2 but showing modifications of the armature portion of the machine of FIG. 2.

In the embodiment of FIG. 4, the armature labeled 2A has an armature winding 3 which is an air-gap winding positioned between the rotor 1 and a magnetic material in the form of a segmented back-iron, ring core 11A. Again, each segment of the back-iron ring 11A (i.e., the magnetic core of the armature) is substantially at the same potential as those portions of the winding 3 disposed radially inward therefrom; and the segments are insulated circumferentially from one another by insulating elements 8.

Figure 5:
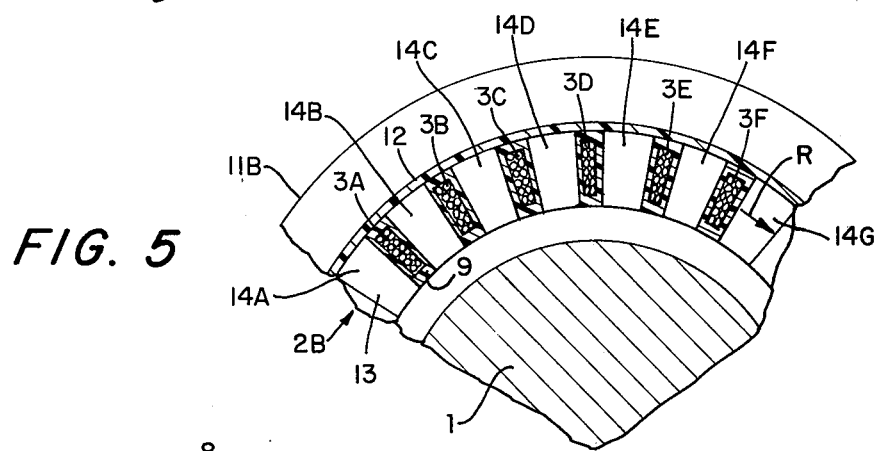

Some other modifications are discussed in this and the next paragraph. The armature labeled 2B in FIG. 5 includes a circumferentially continuous back-iron ring 11B (made of thin laminations), a cylindrical insulator 12 inside the back-iron ring 11B, and an active section 13 of the armature disposed within the insulator 12 and composed of segments 14A, 14B. . . of magnetic material circumferentially interposed between armature conductors 3A, 3B. . . of the continuous gradient winding. The insulation tube 12, of course, must withstand full machine potential, a condition which can be changed to satisfy particular requirements by segmenting the ring 11B circumferentially in the manner that the ring 11A is segmented.

Figure 6:
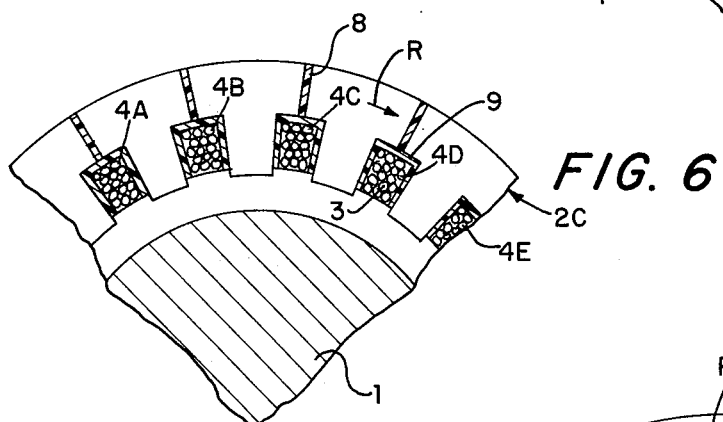

The armature shown at 2C in FIG. 6 has a magnetic core in the form of a slotted core in which the slots labeled 4A, 4B. . . are located circumferentially at the position of the insulation 8 between segments like the slots 10B' and 10B'' in FIG. 7.

As previously noted, the machine herein disclosed has greatest use in connection with very high voltage systems. It may be, for example, a superconducting generator wherein, as discussed in said application Ser. No. 166,083, the generator output voltage is the system transmission voltage, that is, hundreds of thousands of volts. Or the machine can be a very high voltage machine of the types described in said application Ser. No. 256,972.

Modifications of the invention herein described will occur to persons skilled in the art and all such modifications are deemed to be within the spirit and scope of the invention as defined by the appended claims.

What is claimed is:

1. A rotating electric machine that comprises, in combination, rotatable field means, and an armature having a controlled gradient a-c winding and containing a high permeability magnetic material subdivided in the circumferential direction into a plurality of segments, each segment being electrically insulated circumferentially from all other segments.

2. An electric machine as claimed in claim 1 in which the rotatable field means comprises an induction winding.

3. An electric machine as claimed in claim 1 in which the electric potential of each segment is substantially the same as the electric potential of the adjacent portion of the controlled gradient winding.

4. An electric machine as claimed in claim 3 in which the magnetic material is in the form of a slotted core, in which the conductors making up the winding are disposed within the slots, and in which each electrically insulated segment contains at least one slot.

5. A rotating electric machine that comprises, in combination, rotatable field means and an armature having a controlled gradient a-c winding and containing a high permeability magnetic material subdivided in the circumferential direction into a plurality of segments, each segment being electrically insulated circumferentially from all other segments, the electric potential of each segment being substantially the same as the electrical portion of the controlled gradient winding adjacent thereto, said magnetic material being in the form of a circumferentially segmented back-iron ring core, the controlled gradient winding being an air gap winding disposed between the rotatable field means and the back-iron ring core, each segment of the back-iron ring core being substantially at the same potential as those portions of the winding disposed radially inward therefrom.

6. A rotating electric machine that comprises, in combination, rotatable field means and an armature having a controlled gradient a-c winding and containing a high permeability magnetic material subdivided in the circumferential direction into a plurality of segments, each segment being electrically insulated circumferentially from all other segments, the electric potential of each segment being substantially the same as the electrical portion of the controlled gradient winding adjacent thereto, said machine further including a solid back-iron ring, a cylindrical insulator inside the back-iron ring, an active section of the armature disposed within the insulator and composed of segments of magnetic material circumferentially interposed between conductors of the controlled gradient winding.

7. A rotating electric machine that comprises, in combination, rotatable field means and an armature having a controlled gradient a-c winding and containing a high permeability magnetic material subdivided in the circumferential direction into a plurality of segments, each segment being electrically insulated circumferentially from all other segments, the electric potential of each segment being substantially the same as the electrical portion of the controlled gradient winding adjacent thereto, said magnetic material being in the form of a slotted core whose slots are located circumferentially at the position of the insulation between adjacent segments.

8. A rotating electric machine as claimed in claim 7 in which the segments each contain at least one interior slot to receive armature conductors of said winding.

9. A rotating electric machine that comprises, in combination: field means and an armature, said armature having a controlled gradient winding and a high permeability magnetic core subdivided in the circumferential direction into a plurality of segments each segment being electrically insulated from the other segments making up the core.

10. Apparatus as claimed in claim 9 in which the field means is a superconducting field.

11. Apparatus as claimed in claim 10 in which the machine is a generator operable to generate at a system transmission voltage of hundreds of thousands of volts.

12. An armature for a rotating electric machine, that comprises: a controlled gradient armature winding and a magnetic core, said core being subdivided in the circumferential direction into a plurality of segments, each segment being electrically insulated from the other segments.

* * * * *